United States Patent [19]

Ewen

[11] 3,946,385

[45] Mar. 23, 1976

[54] INTERFEROMETRIC NAVIGATION AND GUIDANCE SYSTEM

[75] Inventor: Harold I. Ewen, Weston, Mass.

[73] Assignee: The United States of America as represented by the Secretary of the Department of Transportation, Washington, D.C.

[22] Filed: Jan. 20, 1975

[21] Appl. No.: 542,505

[52] U.S. Cl............. 343/102; 343/107; 343/108 R; 343/112 TC
[51] Int. Cl.².......................................... G01S 1/20
[58] Field of Search...... 343/102, 107, 108, 112 TC

[56] References Cited
UNITED STATES PATENTS
3,665,468  5/1972  Fleming et al...................... 343/102

Primary Examiner—Maynard R. Wilbur
Assistant Examiner—Richard E. Berger
Attorney, Agent, or Firm—Herbert E. Farmer; Harold P. Deeley, Jr.

[57] ABSTRACT

This invention comprises an interferometric technique for the one-way transmission of bearing angle information to an unlimited number of mobile receivers. In accordance with the invention the angle related path length difference, between transmitters located at either end of an interferometer baseline, to a mobile receiver is measured in wavelengths at a modulation frequency.

6 Claims, 3 Drawing Figures

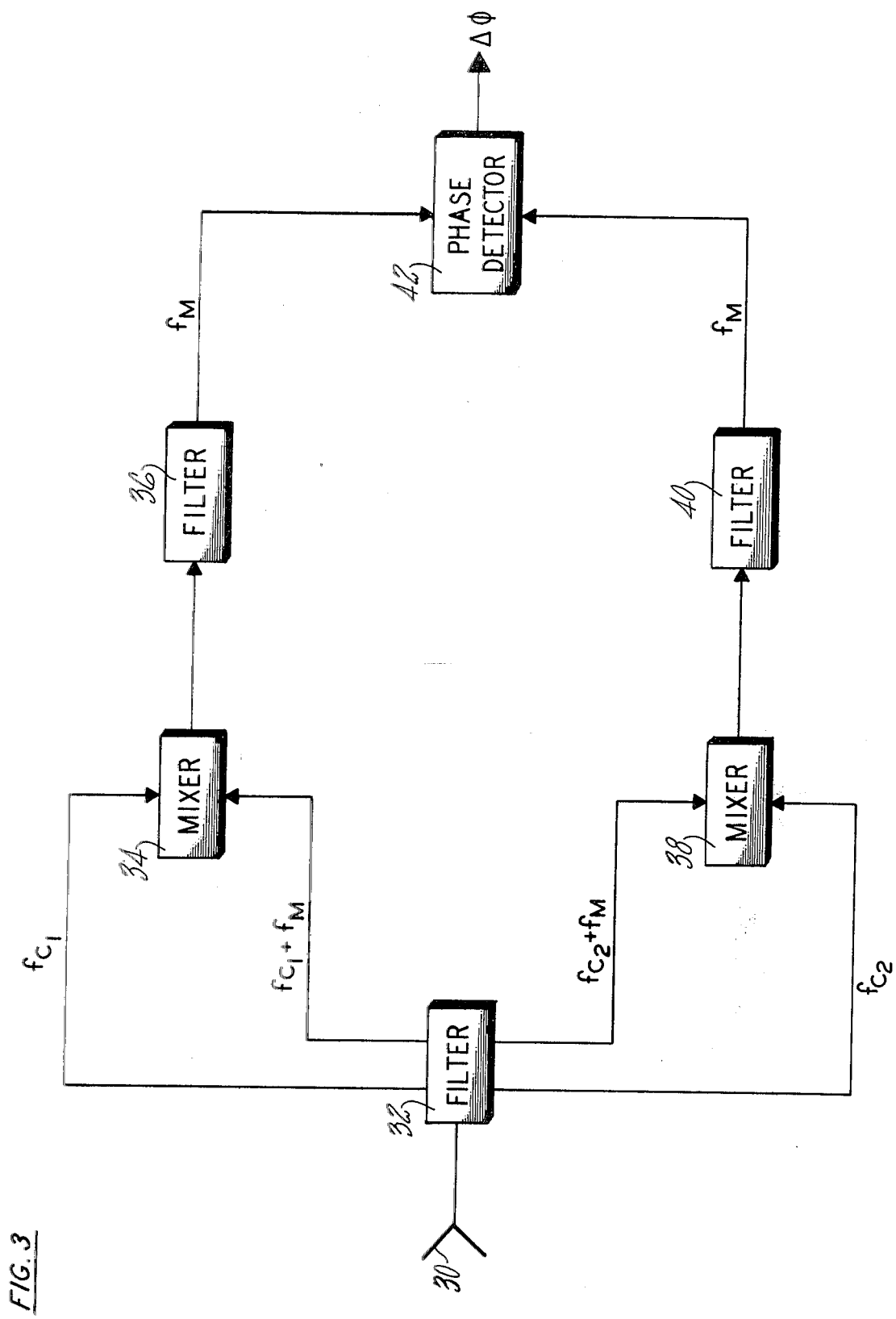

INTERFEROMETRIC NAVIGATION AND GUIDANCE SYSTEM

ORIGIN OF THE INVENTION

The invention described herein was made in the course of, or under, a contract with the United States Department of Transportation and may be manufactured and used by or for the Government of the United States of America for governmental purposes without the payment of any royalties thereon or therefor.

BACKGROUND OF THE INVENTION

1. Field of the Invention

The present invention relates to direction finding systems and particularly to such systems of the type employing a pair of spaced antennas by which carrier and sideband waves may be radiated to a remote point and may be received at the remote point and utilized to provide an indication of the direction of the remote point from the spaced antennas. More specifically, this invention relates to the simultaneous one-way transmission of bearing angle information from a single transmitter station to an unlimited number of mobile receivers. Accordingly, the general objects of the present invention are to provide novel and improved apparatus and methods of such character.

2. Description of the Prior Art

One-way transmission of pointing or bearing angle information from a transmitter fixed in a local framework of reference to a mobile receiver in the same reference system is well known in the art. Prior art methods for one-way transmission of bearing angle information may be generally classified as scanning fan beam techniques or interferometric techniques.

In the context of an air traffic control system, prior art scanning fan beam techniques employ a transmitted beam of electromagnetic radiation which scans across the coverage sector in both azimuth and elevation. The fan beam in each coordinate is generated by a single antenna to define a spatial/time angular resolution. Scanning beam techniques, whether electronic or mechanical means are employed to achieve the scanning, limit the available data rate since each passage of the beam across the airborne receiver represents a single data point with the time interval to the subsequent data point determined by sector angle coverage requirements and scan rate. Increasing the scan rate to reduce the time reference interval between sequential data points reduces the observing time available for each data point; i.e., the dwell time of the fan beam on the receiver is decreased as the scan rate is increased; and thus has a deleterious effect on the accuracy of the measurement as well as on the bandwidth (amount of spectrum) required by the system.

Interferometric techniques include those systems wherein bearing angle in either coordinate is determined by measuring the path length difference between either end of a fixed baseline to a point, as shown in FIG. 1. In a typical embodiment the point will be a mobile receiver, and a pair of transmitting antennas will be located at either end of the baseline. The bearing angle, $\theta$, to the mobile receiver measured in the plane containing the baseline and the receiver is given by:

$$\theta = \sin^{-1}(L/d) \tag{1}$$

where:
$L$ = the path length difference between either end of the baseline and the mobile receiver, and
$d$ = the baseline length.

Although the object of most inteferometric techniques is to perform an angle measurement, this is accomplished through the measurement of the path length difference, L, by radiating signals from antennas located at either end and/or along the baseline. By appropriate processing of these signals the receiver is capable of deriving the path length difference, L. Since the value of the baseline length, $d$, is known, the bearing angle $\theta$ is uniquely determined by the path length difference measurement in accordance with Equation (1). It is for this reason that interferometric techniques are frequently referred to as self-coded; i.e., an angle related tone is not transmitted as in the case of mechanical scanning beam systems. In interferometric systems each angle relative to a particular baseline bears a unique relationship to the path length difference, measured from each end of the baseline, in that angular direction. The measured path length difference is represented by the surface of a cone with the baseline as the conical axis.

If a second baseline with associated transmitters were placed orthogonal to the first the measurable path length difference would also generate a series of conical surfaces, each corresponding to a specific angle, in which the second baseline is the conical axis of the second set of conical surfaces. The intersection of the conical surfaces represented by two orthogonal baseline transmitter systems uniquely determines the bearing angles of the receiver relative to the orthogonal baselines in the local framework of reference.

The foregoing interferometric principles apply to both conventional prior art techniques as well as to the present invention.

In the conventional prior art interferometric techniques, a carrier signal at a frequency $f_c$ is radiated from an antenna element at one end of a baseline and a sideband signal at $f_c + f_m$ is radiated from an antenna at the other end of the baseline. The modulation frequency, $f_m$, is also simultaneously radiated on a subcarrier from an antenna located on or near the baseline. At the receiver, the carrier and sideband signals are heterodyned to extract the modulation frequency, $f_m$. The phase of the modulation frequency resulting from this heterodyning action is shifted relative to the phase of the modulation frequency simultaneously received on the subcarrier by an angular amount determined by the path length difference between either end of the baseline and the receiver. The phase shift occurs as a consequence of the fact that the carrier and sideband signals travel over paths to the receiver that differ in length by an amount corresponding to the observed phase shift. Thus, in the prior art, the measurement of the difference between the phase of the modulation frequency, derived by heterodyning the received carrier and sideband signals, and the phase of the modulation frequency, simultaneously transmitted on a subcarrier, is related to the path length difference L in accordance with the following:

$$L = (\lambda_c \phi)/(2\pi) \tag{2}$$

where $\lambda_c$ = the wavelength measured at the carrier frequency. The receiver determines the position angle θ through the measurement of the phase difference φ from the relationship:

$$\theta = \sin^{-1}\left[\left(\frac{\lambda_c}{2\pi d}\right)\phi\right] \qquad (3)$$

which is obtained directly from Equations (1) and (2).

The important feature to be noted in regard to Equations (2) and (3), and hence to prior art interferometric techniques, is that the phase difference measured by the receiver refers to a corresponding path length difference measured in fractional wavelengths at the carrier frequency even though the phase difference measurement is performed at the modulation frequency. This characteristic of prior art interferometric methods leads to two major restraints and concomitant disadvantages associated with prior art interferometric technique, namely angular ambiguity and low data rate.

Angular ambiguity arises as a consequence of the conflicting requirements associated with minimum baseline length d required to achieve a desired angular resolution, and the maximum separation of transmitting elements allowed to assure a unique bearing angle relationship for each measured value of phase difference φ. The latter restraint is fully deduced from the foregoing analysis by noting the presence of a cyclic phase ambiguity associated with path length differences which are integer values of the carrier wavelength; i.e., the measured phase difference φ will have the same value for all angles which differ in path length by one wavelength at the carrier frequency. Although means have been developed for resolving such particular ambiguities, such means involve time division multiplexing of the transmitted signal among a number of transmitting antenna elements located along the baseline in addition to the antennas located at either end of the baseline. As a result, the time required by the receiver to resolve the ambiguity and determine the specific angle θ is determined by the time needed to process the several time multiplexed signals on their sequential arrival at the receiver. Consequently, as the required sector angle coverage is increased the time required to resolve the angle ambiguity is also increased thus resulting in a reduction in data rate. Prior art means for resolving angle ambiguity are comparatively complex and thus have an additional deleterious effect on system cost and reliability.

An additional restraint imposed on prior art interferometric methods results from errors associated with motion of the receiver relative to the transmitter during the time of position angle measurement. Since the fundamental parameter involved in the measurement of the bearing angle is the phase difference between two frequencies; i.e., a carrier frequency transmitted from one end of the baseline and a carrier plus modulation frequency transmitted from the other end; a Doppler error related to receiver velocity in the direction of the transmitter will be introduced directly on the difference or modulation frequency thereby resulting in a velocity related angle measurement error. To minimize the effect of Doppler errors, it is necessary in prior art interferometric methods to utilize a relatively low modulation frequency, usually in the audio range or at least limited to approximately 100 KHz, since the magnitude of the Doppler error, for a given velocity, is directly proportional to the modulation frequency.

Interferometric techniques do, however, overcome several of the above-discussed disadvantages of scanning fan beam techniques as a consequence of the inherent ability of an interferometric system to simultaneously transmit a signal format over a broad angle coverage sector from which an unlimited number of airborne receivers may determine their position angle relative to the interferometer baseline. Although the angular width of the sector which can be covered by prior art interferometric techniques without encountering angular ambiguity is significantly larger than the width of a scanning fan beam capable of providing equivalent performance, typical air traffic control sector coverage requirements exceed the ambiguity limits of simple prior art interferometric techniques. As discussed above, prior art interferometric methods for overcoming angle ambiguity restraints, in order to provide improved angle sector coverage, have the disadvantage that the antenna systems employed are complex. Additionally, prior art interferometric techniques generally require that critical proportioning of circuit constants be established and maintained between the elements of the transmitting apparatus if satisfactory operation of the direction finding system is to be realized. There is the further disadvantage that the receiving apparatus used in such prior art interferometric systems is relatively complex and therefore expensive.

SUMMARY OF THE INVENTION

The present invention overcomes the above briefly discussed and other deficiencies and disadvantages of the prior art by providing a novel and improved interferometric navigation and guidance system.

In the present invention the physical geometry of the transmitter configuration is independent of the carrier frequency selected; the carrier signals are used only to carry the angle data information which is totally contained in the phase characteristics of the received modulation frequencies. Consequently, the spacing of the transmitting antennas in accordance with the present invention is determined by the wavelength of the modulation frequency, which may be one to two orders of magnitude greater than the carrier frequency wavelength at typical air traffic control microwave frequencies. As a result, the transmitting antennas can be configured as completely separate apertures physically located at either end of a baseline. This is a significantly less complex transmitter configuration than required in prior art methods wherein the total extent of the baseline is occupied by a reflecting surface illuminated by a complex multiple element feed structure. In the present invention, the design of the transmitting antennas is restrained primarily by the angle sector coverage requirements and not by antenna feed element spacings at the carrier frequency as required by the prior art methods. Also, as previously noted, the modulation frequency can be significantly higher than employed in prior art interferometric techniques, since the present invention completely cancels the effect of velocity induced Doppler errors. Although a Doppler error is introduced in the measured phase of the modulation frequency received from either transmitting antenna in a two antenna system, the magnitude of this error is precisely the same for the modulation frequency received from the other antenna. Since the phase difference between the two modulation frequencies is the measured parameter, the Doppler error, which is equivalent in either is cancelled in the process of obtaining their bearing angle related phase difference.

In order to implement the present invention a number of essential criteria must be observed. First, an antenna at a first end of a baseline must transmit a carrier and sideband frequency simultaneously with the transmission of a separate carrier and sideband frequency from the antenna element at the other end of the baseline. The frequency separation and phase relationship of each sideband to its carrier must be the same; this being accomplished by use of a common modulation frequency generator for both carriers. Finally, the frequency separation of the carrier signals, which are to be transmitted simultaneously, must be sufficient to make negligible any phase errors associated with filtering as may be required for their separate identification at the receiver or, alternatively, receiver induced phase delays must be the same for all frequencies within the phase measurement accuracy required to achieve a desired angle position measurement accuracy.

Considering the least complicated configuration wherein bearing angle information is transmitted to a mobile receiver, in a preferred embodiment of the present invention a pair of transmitting antennas are located at either end of a baseline. The nominal spacing between the antennas; i.e., the baseline length; is one wavelength at the modulation frequency rather than one wavelength at the carrier frequency as in prior art techniques. Each antenna simultaneously transmits a carrier and a sideband signal rather than one antenna transmitting a carrier and the other a sideband as in prior art techniques. The carrier frequencies are displaced to allow separate identification of the signals transmitted by each antenna. The frequency of each sideband signal is displaced from its carrier frequency by the modulation frequency. The modulation frequency, however, is common to each carrier; a single modulation frequency generator being employed to modulate the separate carrier frequencies.

The carrier and sideband signals transmitted from each antenna are heterodyned at the receiver to derive the modulation frequency. By this process the receiver derives a modulation frequency associated with the two signals radiated from one end of the baseline and at the same time a modulation frequency is derived from the carrier and sideband signals radiated from the other end of the baseline. Although the heterodyning action results in two modulation "frequencies", these modulation "frequencies" are in fact at the same frequency by virtue of the means of their transmission. Their phase, however, differs as a consequence of the path length difference between either end of the baseline and the receiver. In the present invention this phase difference is directly related to the path length difference in accord with:

$$\phi = (2\pi L)/\lambda_m \qquad (4)$$

in which $\lambda_m$ is the wavelength at the modulation frequency, rather than at the carrier frequency as in prior art techniques.

It is an object of the present invention, therefore, to provide a new and improved navigation system which avoids one or more of the disadvantages and limitations of prior art scanning beam and interferometric systems.

It is a further object of the invention to provide a navigation system based on intermediate frequency interferometric principles which overcomes both data rate and angle coverage restraints imposed by conventional prior art application of interferometric principles.

It is also an object of the invention to provide an interferometric angle measurement equipment whose geometrical parameters are essentially independent of the carrier frequency of operation; thereby providing wide angle coverage without the limitations of angle ambiguity and related complexities associated with prior art interferometric methods.

It is a further object of the invention to provide an angle measurement system unrestrained in data rate by the complexities of angular ambiguity associated with prior art methods.

It is an additional object of the invention to provide interferometric angle measurement equipment whose performance is independent of the velocity of a mobile receiver in the direction of the transmitter.

It is another object of the present invention to provide a guidance system, wherein an unlimited number of aircraft, if each is provided with a receiver according to the invention, will receive both elevation and azimuth angle direction data from a ground based transmitter in accordance with the invention.

BRIEF DESCRIPTION OF THE DRAWING

The present invention may be better understood and its numerous objects and advantages will become more apparent to those skilled in the art by reference to the accompanying drawings wherein:

FIG. 3 is a functional block diagram of a receiver for use with the transmitter of FIG. 2 in the practice of the present invention.

DESCRIPTION OF THE PREFERRED EMBODIMENT

Figure 2:
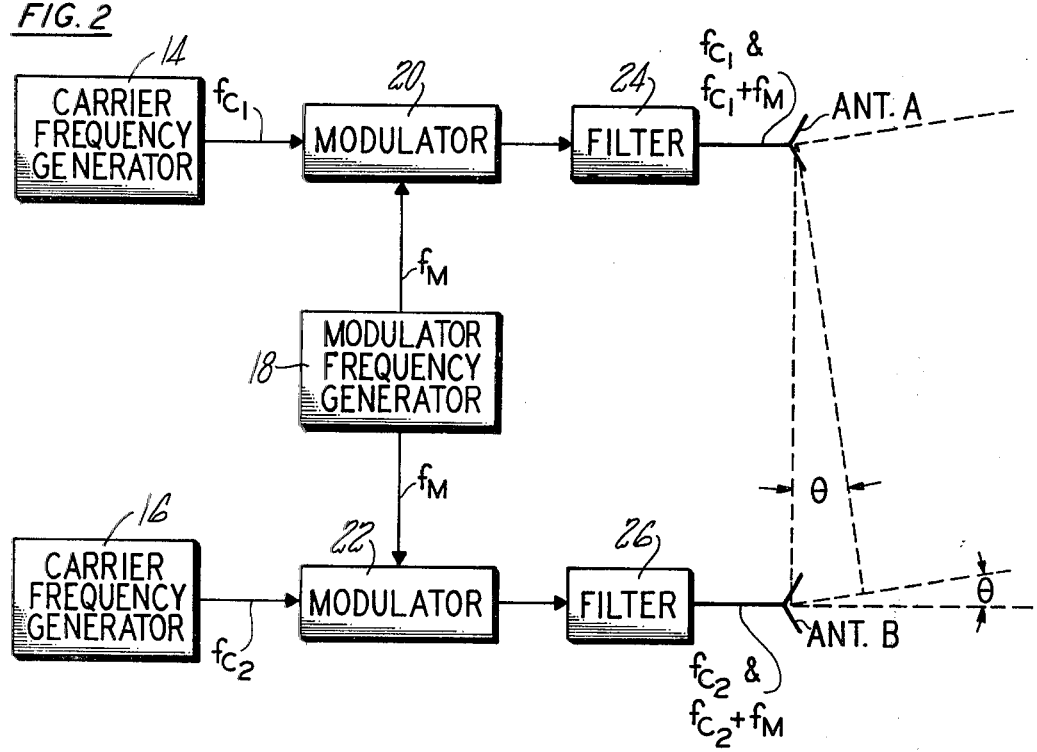
FIG. 2 is a functional block diagram of a two element transmitter in accordance with the present invention.

As noted above, the present invention differs from prior art interferometric techniques in the method by which carrier and sideband frequencies are transmitted from radiating elements located at either end of a common baseline. With reference to FIG. 2, which is a functional block diagram of a simple two element transmitter station in accordance with a preferred embodiment of the invention, a pair of transmitting antennas A and B are located at either end of a baseline. The nominal spacing between antennas A and B; i.e., the baseline length $d$; is one wavelength at the modulation frequency. As will be discussed in greater detail below, each of the antennas A and B simultaneously transmits a carrier and a sideband signal. The carrier frequencies are displaced to allow separate identification of the signals transmitted by each antenna. The modulation frequency, however, is common to each carrier.

The carrier frequency signal generators 14 and 16, associated respectively with antennas A and B, generate carrier frequency signals $f_{c_1}$ and $f_{c_2}$. The frequency separation between these two carrier signals, which do not have to be phase related, is determined by the ease with which the carrier signals can be separately filtered and identified at the receiver. The carrier frequency signals $f_{c_1}$ and $f_{c_2}$ from generators 14 and 16 are respectively modulated, in modulators 20 and 22, by a common modulation signal $f_m$ provided by a modulation frequency generator 18. The output signals from modulators 20 and 22 are filtered, in respective filters 24 and 26, to derive the original carrier frequency and one sideband. In the embodiment being described it will be presumed that the upper sideband is selected for each transmitter channel. Accordingly, the signal transmitted from antenna A will be the carrier $f_{c_1}$ and the upper sideband frequency $f_{c_1} + f_m$. Similarly, the signal transmitted from antenna B is carrier frequency $f_{c_2}$ and upper sideband frequency $f_{c_2} + f_m$.

Figure 1:
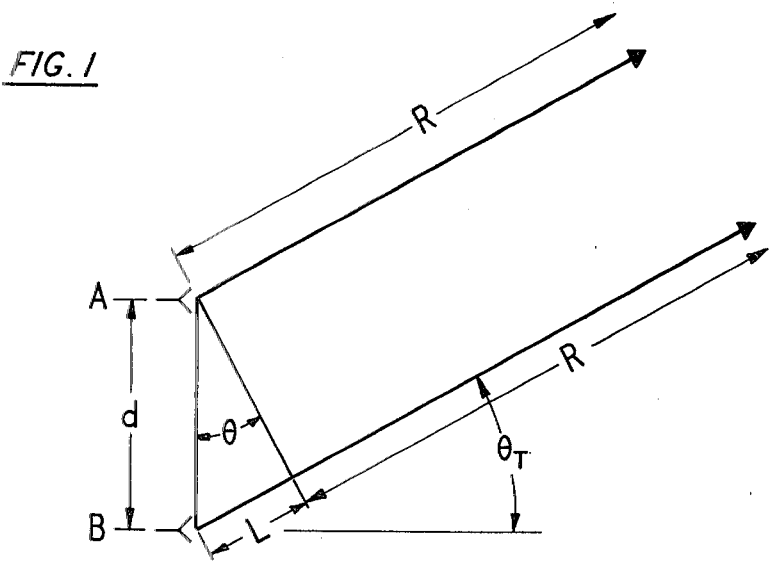
FIG. 1 is a representation of the "problem geometry", in a single coordinate, to which the present invention is directed.

For purposes of explanation, and with reference again to FIG. 1, it will be presumed that the angular relationship between the receiver and baseline is such that the distance R from antenna A to the receiver is less than the distance R + L between antenna B and the receiver. It will also be assumed that the amplitude of each of the signals on arrival at the receiver is adequate for detection and processing and thus it is necessary to consider only the frequency and phase terms associated with each of the received signals.

On arrival at the receiver the sideband signal $f_{c_1} + f_m$, hereinafter $S_1$, transmitted from antenna A will have the form:

$$S_1 = \cos\left[(\omega_{c_1} + \omega_m)t + \frac{2\pi R}{\lambda_{s_1}}\right] \quad (5)$$

where:
$\omega_c = 2\pi f_c$
$\omega_m = 2\pi f_m$
$\lambda_s$ = sideband $(f_{c_1} + f_m)$ wavelength On arrival at the receiver, the carrier signal $f_{c_1}$, hereinafter $C_1$, transmitted from antenna A has the form:

$$C_1 = \cos\left[\omega_{c_1} t + \frac{2\pi R}{\lambda_{c_1}}\right] \quad (6)$$

where:
$\lambda_{c_1}$ = carrier $(f_{c_1})$ wavelength
Similarly, the sideband signal $f_{c_2} + f_m$, hereinafter $S_2$, has the following frequency and phase relationship on arrival at the receiver:

$$S_2 = \cos\left[(\omega_{c_2} + \omega_m)t + \frac{2\pi R}{\lambda_{s_2}} + \frac{2\pi L}{\lambda_{s_2}}\right] \quad (7)$$

where:
$\omega_{c_2} = 2\pi f_{c_2}$
$\lambda_{s_2}$ = sideband $(f_{c_2} + f_m)$ wavelength
and the carrier signal $f_{c_2}$, hereinafter $C_2$, has the following frequency and phase relationships:

$$C_2 = \left[\cos\omega_{c_2} t + \frac{2\pi R}{\lambda_{c_2}} + \frac{2\pi L}{\lambda_{c_2}}\right] \quad (8)$$

where:
$\lambda_{c_2}$ = carrier $(f_{c_2})$ wavelength.

Referring to FIG. 3, a preferred embodiment of circuitry for processing the received signals given by Equations (5), (6), (7) and (8) is shown in functional block diagram form. The carrier and sideband signals transmitted from antennas A and B and received at the receiver antenna 30 are separately filtered in a filter circuit 32. Thereafter, the carrier and sideband signals transmitted by antenna A are heterodyned in a mixer circuit 34 and the output of circuit 34 is filtered in a filter circuit 36 to extract the difference or beat frequency between the carrier and sideband signal. This beat frequency signal will, of course, be at the modulation frequency $f_m$. Similarly, the carrier and sideband signals transmitted from antenna B will be heterodyned in mixer circuit 38 and the resultant signal filtered in filter circuit 40 to produce a second beat frequency signal at modulation frequency $f_m$. The two signals at the modulation frequency are thereafter applied to a phase detector 42.

Functionally, the combined action of mixer circuit 34 and filter circuit 36 produces, from the multiplication of the sideband signal $S_1$ and the carrier signal $C_1$, as given by Equations (5) and (6) above, the following output modulation frequency and phase relationship:

$$M_1 = \cos\left[\omega_m t + 2\pi R\left(\frac{1}{\lambda_{s_1}} - \frac{1}{\lambda_{c_1}}\right)\right] \quad (9)$$

In a similar manner, the output frequency and phase relationship obtained by multiplying sideband signal $S_2$ and carrier signal $C_2$, as given by Equations (7) and (8) above, and extracting the difference frequency component in mixer circuit 38 and filter circuit 40, provides a frequency and phase relationship which may be stated as follows:

$$M_2 = \cos\left[\omega_m t + 2\pi R\left(\frac{1}{\lambda_{s_2}} - \frac{1}{\lambda_{c_2}}\right) + 2\pi L\left(\frac{1}{\lambda_{s_2}} - \frac{1}{\lambda_{c_2}}\right)\right] \quad (10)$$

Since the modulation frequency is common to both carriers, then:

$$\frac{1}{\lambda_{s_1}} - \frac{1}{\lambda_{c_1}} = \frac{1}{\lambda_m} = \frac{1}{\lambda_{s_2}} - \frac{1}{\lambda_{c_2}} \quad (11)$$

where $\lambda_m$ = modulation frequency $(f_m)$ wavelength.

Introducing the immediately preceding relationships into Equations (9) and (10) it is apparent that the phase difference, $\phi$, between the modulation frequency $M_1$ and the modulation frequency $M_2$, obtained at the output of phase detector 42 is:

$$\phi = \frac{2\pi L}{\lambda_m} \quad (12)$$

Consequently:

$$L = \frac{\lambda_m \phi}{2\pi} \quad (13)$$

and from Equation (1):

$$\theta = \sin^{-1}\left[\frac{\lambda_m \phi}{2\pi d}\right] \quad (14)$$

If the spacing, d, between the transmitting antennas A and B is one wavelength at the modulation frequency; i.e., the baseline length $d = \lambda_m$, then:

$$\theta = \sin^{-1}\left[\frac{\phi}{2\pi}\right] \quad (15)$$

It is to be noted that the preceding discussion of the invention was principally in terms of a "simultaneous mode" of operation, wherein a separate carrier frequency is assigned to each transmitting antenna. In some applications the number of separate carrier frequencies required may be substantial. For example, the transmission of bearing angle information in the angle coordinates of both elevation and azimuth for an instrument landing system would require a total of four separate carrier frequencies if the elevation angle baseline were located separate of the azimuth angle baseline. If the two baselines were colocated only three antennas and three carrier frequencies would be required; each baseline would share a common antenna element. While simultaneous transmission of multiple carriers and their associated sidebands is not a difficult technical requirement, conservation of the frequency spectrum may dictate the use of a "sequential mode" of operation. In the "sequential" method of implementation of the present invention the general requirements noted above may be accomplished by time sharing or sequentially transmitting one carrier and sideband signal combination between selected antennas, with assurance that the fundamental requirement for simultaneous transmission occurs for antennas located at either end of a common baseline, regardless of the time sharing sequence of these carriers and sidebands with other baselines. Use of the sequential method, of course, implies the need for a coded sequence format to insure knowledge at the receiver concerning the order in which the antennas are involved in the transmitting sequence.

While a preferred embodiment has been shown and described, various modifications and substitutions may be made thereto without departing from the spirit and scope of the invention. Thus, by way of example, while the transmission of radio frequency information has been discussed, the present invention can be applied to acoustic waves leading to the transmission of bearing angle information in underwater applications. The present invention can also be applied to the microwave modulation of coherent light beams, disposed in an interferometric array, for transmitting bearing angle information. Accordingly, it is to be understood that the present invention has been described by way of illustration, and not limitation.

What is claimed is:

1. A method of intermediate frequency interferometry comprising the steps of:
    generating a first carrier frequency;
    generating a second carrier frequency;
    generating a modulation signal;
    employing the modulation signal to generate a first sideband frequency relative to the first carrier frequency and a second sideband frequency relative to the second carrier frequency, each sideband frequency having the same frequency and phase relationship relative to its carrier frequency;
    transmitting the carrier frequencies and their related sideband frequencies from respective points located on a common baseline;
    receiving and separating the transmitted signals at a single point;
    extracting the modulation frequency from each carrier and its related sideband; and
    comparing the phase of the extracted modulation frequencies to obtain an indication of the bearing angle between the point of signal reception and the baseline.

2. The method of claim 1 wherein the step of transmitting further includes:
    simultaneousely delivering respective carrier and related sideband signals to a pair of antennas separated by a distance which is one wavelength at the common modulation frequency.

3. A passive direction finding system comprising:
    means for generating a first carrier frequency signal;
    means for generating at least a second carrier frequency signal;
    means for generating a modulation signal at a frequency lower than any of said carrier frequency signals;
    modulator means responsive to each of said carrier frequency signals and to said modulation signal for generating sideband signals for said first and second carrier frequency signals;
    means for respectively transmitting said carrier signals and associated sideband signals, said transmitting means each including an antenna located at either end of a baseline, said antennas being separated by a nominal distance equivalent to the wavelength of the said modulation frequency; and
    means for receiving the transmitted carrier and associated sideband signals, said receiving means generating a modulation frequency signal commensurate with the frequency difference between each transmitter carrier frequency signal and its associated transmitted sideband signal, the phase difference between the modulation signal derived from the first carrier and its sideband and the modulation signal derived from the second carrier and its sideband being commensurate with the bearing angle from the receiver to the antennas located on the baseline.

4. The apparatus of claim 3 wherein said receiving means comprises:
    means for heterodyning each carrier with its associated sideband to generate signals at the said modulation frequency; and
    phase detector means responsive to said signals at the modulation frequency for providing an output signal commensurate with the phase difference therebetween.

5. The apparatus of claim 3 wherein said transmitting means includes:
    a pair of antennas spaced at either end of a baseline; and
    means for simultaneously delivering a carrier frequency and a single related sideband signal frequency from said modulator means to each of said antennas.

6. The apparatus of claim 4 wherein said transmitting means includes:
    a pair of antennas spaced at either end of a baseline; and
    means for simultaneously delivering a carrier frequency and a single related sideband signal frequency from said modulator means to each of said antennas.

* * * * *